United States Patent [19]
Yates

[11] Patent Number: 6,036,142
[45] Date of Patent: Mar. 14, 2000

[54] VECTORABLE NOZZLE FOR AIRCRAFT

[75] Inventor: Martin H Yates, Berkeley, United Kingdom

[73] Assignee: Rolls-Royce, plc, London, United Kingdom

[21] Appl. No.: 08/204,046

[22] Filed: Feb. 25, 1994

[30] Foreign Application Priority Data

Mar. 13, 1993 [GB] United Kingdom .................... 9305224

[51] Int. Cl.⁷ ........................... B64C 29/00; B63H 11/10
[52] U.S. Cl. ..................................... 244/23 D; 239/265.19
[58] Field of Search ............................... 244/23 A, 23 B, 244/23 D, 12.4, 12.5; 239/265.19

[56] References Cited

U.S. PATENT DOCUMENTS

| | | | |
|---|---|---|---|
| 3,241,312 | 3/1966 | Clark | 244/23 D |
| 3,248,877 | 5/1966 | Alderson et al. | 244/23 D |
| 3,486,716 | 12/1969 | Haberkorn et al. | 244/23 D |
| 3,981,451 | 9/1976 | Prior et al. | 239/265.13 |
| 4,222,234 | 9/1980 | Adamson | 244/23 D |
| 4,474,345 | 10/1984 | Musgrove | 244/23 B |
| 4,482,109 | 11/1984 | du Pont | 244/23 D |
| 4,713,935 | 12/1987 | Szuminski et al. | 244/23 D |

FOREIGN PATENT DOCUMENTS

| | | |
|---|---|---|
| 0118181 | 9/1984 | European Pat. Off. . |
| 820721 | 9/1959 | United Kingdom . |
| 1179788 | 1/1970 | United Kingdom . |
| 1272836 | 5/1972 | United Kingdom . |
| 1350895 | 4/1974 | United Kingdom . |
| 1435567 | 5/1976 | United Kingdom . |

Primary Examiner—Charles T. Jordan
Attorney, Agent, or Firm—Oliff & Berridge, PLC

[57] ABSTRACT

A vectorable nozzle for a vertical lift aircraft comprising an array of lift flow deflecting vanes mounted in a frame hinged to an undersurface of the aircraft. The nozzle is formed by a plurality of telescopic shroud members which together with the vane frame are mounted at their forwardmost ends. The disposition of the vanes is such that the lift flow is directed downwards when the nozzle is extended. When the nozzle is retracted the flow is vectored rearwards to provide forward thrust. In this position the nozzle generates minimum aerodynamic drag from forward movement of the aircraft. The nozzle preferably is fully stowed within the aircraft, and concealed by surface doors when not in use.

7 Claims, 3 Drawing Sheets

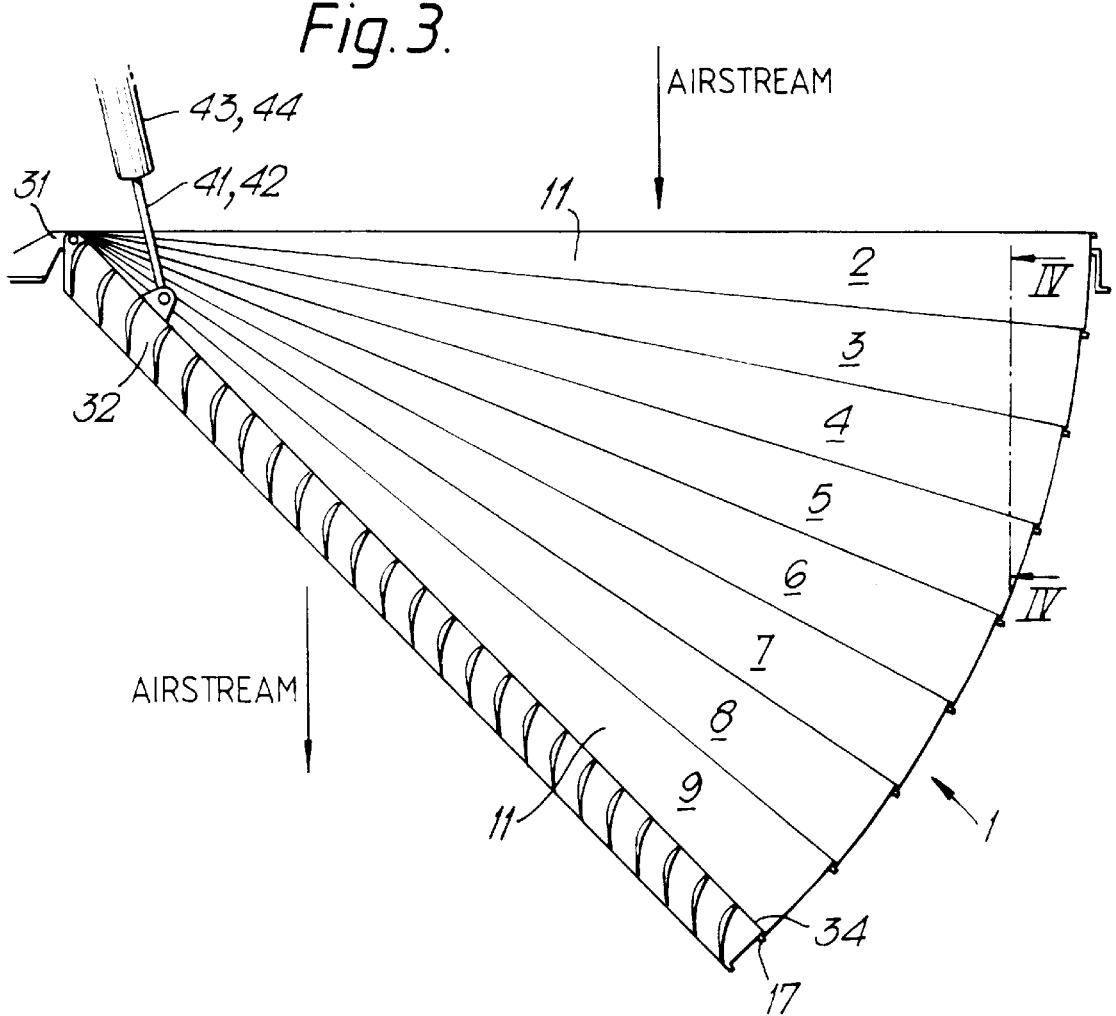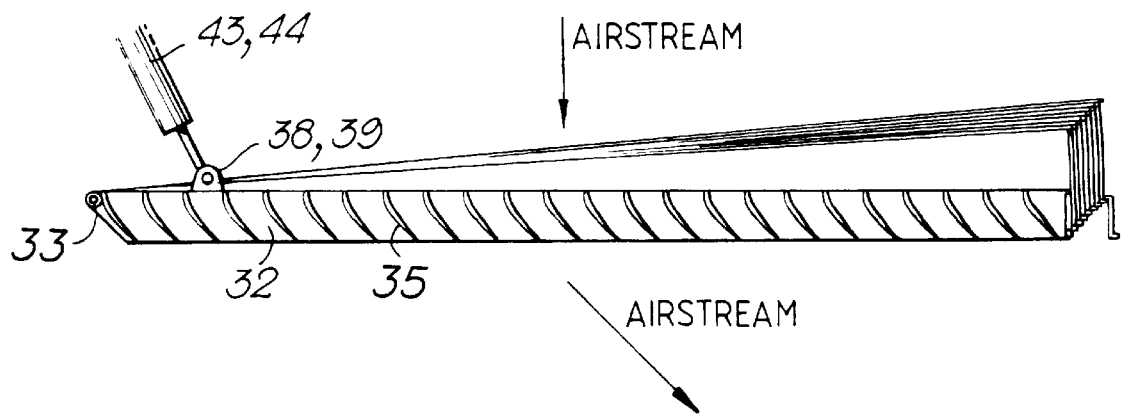

VECTORABLE NOZZLE FOR AIRCRAFT

FIELD OF THE INVENTION

This invention relates to a vectorable nozzle for aircraft possessing vertical lift capability.

BACKGROUND OF THE INVENTION

In particular, the invention concerns aircraft possessing full or partial vertical lift capability in which a ducted gas stream is guided by means of a vectorable nozzle. A number of aircraft having this type of system have been built or proposed. Most notable of these is the British Aerospace HARRIER powered by a Rolls-Royce PEGASUS engine which has four swivellable nozzles to vector hot and cold engine gas streams to generate thrust vectorable between vertical and horizontal directions. The engine exhaust streams are permanently ducted through the four nozzles which contain fixed guide vanes and are disposed in pairs on opposite sides of the aircraft fuselage. A penalty of the nozzle arrangement is a relatively high level of drag since they protrude permanently into airflow over the fuselage.

A development of the vectorable gas stream concept has the main propulsion engine driving one or more lift fans which exhaust selectively through stowable nozzles. These nozzles are deployed when vectored thrust is required but are otherwise stowed behind covers to avoid parasitic drag during a normal flight mode. One of the nozzle designs for this concept has retractable nozzle ducting terminated by a cascade of movable parallel vanes which are turned each about its own longitudinal axis to achieve the vectoring range. A drawback with this type of arrangement remains aerodynamic drag caused by a deployed nozzle. In the proposed arrangement the nozzle is deployed to its fullest extent and the vanes are turned to achieve downwardly directed vertical thrust and to vector the thrust rearwardly in transition to horizontal flight. As a consequence drag forces created by the nozzle increase as forward speed builds-up until such times as the gas stream supply to the nozzle can be terminated and the nozzle retracted. The present invention has for one of its objectives to avoid this drag. For another object it seeks to reduce the weight of the nozzle by avoiding the use of vectorable guide vanes.

SUMMARY OF THE INVENTION

According to one aspect of the invention there is provided a vectoring nozzle comprising a telescoping duct arrangement having at its terminal end thrust deflecting means disposed to vector gas issuing from the duct in a substantially downward direction for vertical lift when the nozzle is extended and in a substantially rearward direction for forward thrust when the nozzle is retracted.

Preferably, the thrust deflecting vanes comprises a cascade of parallel guide vanes carried in a frame pivotally mounted towards its forward side.

According to another aspect of the invention the vectorable nozzle comprises a plurality of generally U-shaped shroud members interlocked one with another in telescoping manner, the U-shaped members being pivoted towards their open sides to a base member whereby said plurality of shroud members may fit one within another so as to telescope together to a stowed position for one mode of operation and to extend to a deployed position for a second mode of operation. The nozzle may be provided with actuation means whereby said plurality of shroud members may be telescoped together or extended.

Each of said plurality of shroud members may be provided with interlocking means whereby adjacent shroud members interlock together when said plurality of shroud members are extended.

The terminal shroud member may support the cascade array of guide vanes each of which vanes may be of the fixed or variable angle kind.

BRIEF DESCRIPTION OF THE DRAWINGS

For a better understanding of the invention a specific embodiment of the invention will now be described by way of example with reference to the accompanying drawings in which:

FIG. 3 is a cross-sectional view of the vectorable nozzle shown in FIG. 1 taken along the plane of section line III—III of FIG. 1, FIG. 5 is a cross-sectional view of the vectorable nozzle shown in FIG. 1 taken along the plane of section line V—V of FIG. 1 but with the nozzle in the stowed position.

DETAILED DESCRIPTION OF THE INVENTION

Figure 1:
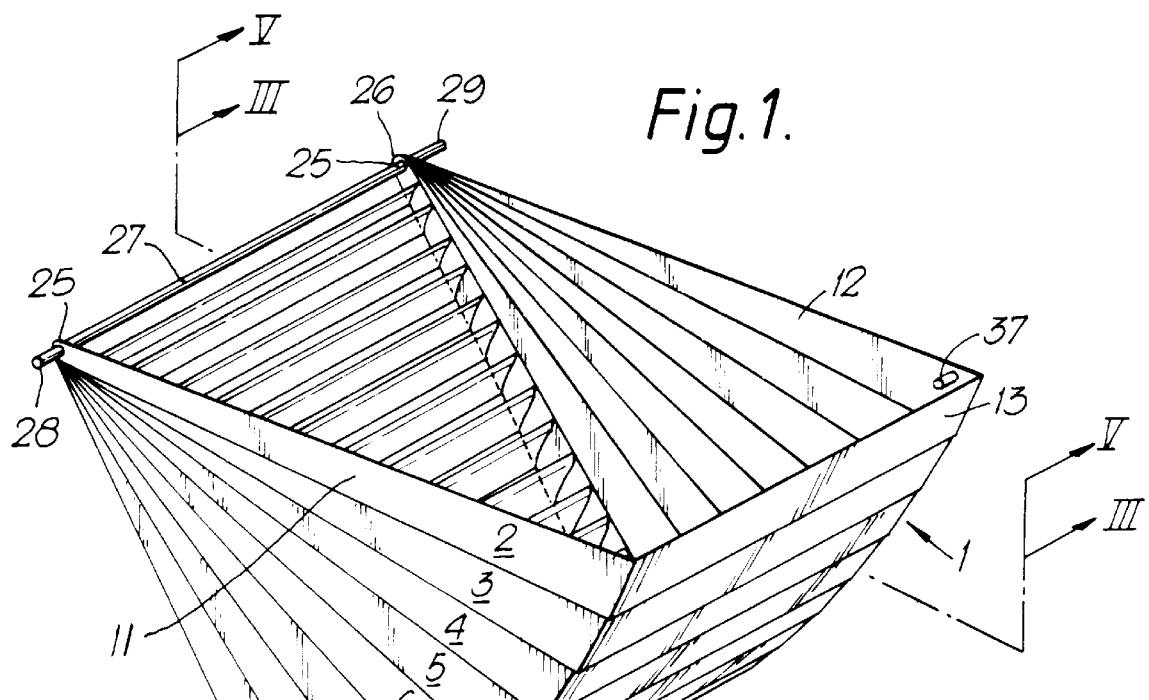
FIG. 1 is a schematic perspective view of a vectorable nozzle comprising a plurality of shroud members according to the invention, the nozzle being shown in the extended, or deployed, position.
Figure 2:
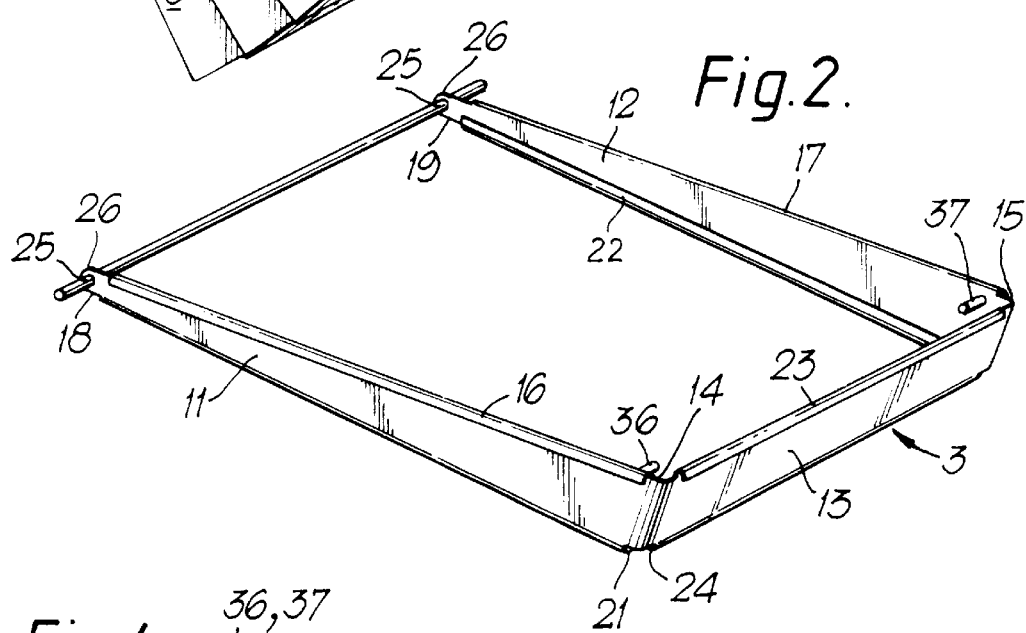
FIG. 2 is a perspective view of one of the shroud members of FIG. 1.
Figure 4:
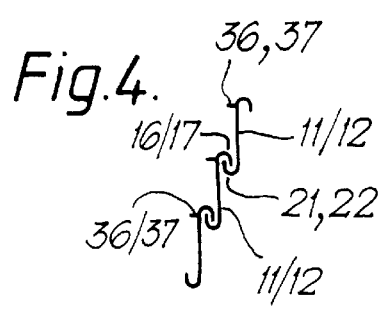
FIG. 4 is a cross-sectional view through three of the shroud members of FIG. 1 taken along the plane of section line IV—IV of FIG. 3.

Referring to the drawings a telescopic vectoring nozzle generally indicated at 1 comprises eight shroud members 2–9 each formed from a plurality of sheet metal sections as shown in FIG. 2. Each section consists of a pair of U-shaped side wall members 11,12 of wedge shape spaced apart by an end wall member 13. The upper edges 14,15 of side wall members 11,12 are rolled over to form outwardly directed elongated hook portions 16,17. The lower edges 18,19 are rolled over to form inwardly directed elongated hook portions 21,22. As can be seen in FIG. 4 the outwardly directed portion 16,17 on the upper edge of one side wall member 11,12 interlockingly engage the inwardly directed hook portion 21,22 on the lower edge of the adjacent side wall member when the nozzle is deployed. When the nozzle is in its stowed position the hook portions 16,17 of one side wall member are disengaged from the hook portions 21,22 of the adjacent side wall member and merely make sliding contact with the surface of the adjacent side wall member. A similar interlocking arrangement is provided on the end wall members 13 where outwardly directed elongated hook portions 23 on the upper edges of the end wall members 13 engage inwardly directed elongated hook portions 24 on the lower edges of the end wall members 13.

An aperture 25 is provided in each side wall member 11,12 adjacent the tip 26 of the wedge shape, in order that a pin 27 may be extended through the apertures. The pin 27 is secured at its ends 28,29 to the surrounding airframe 31 and acts as a hinge pin about which the shroud members 2–9 rotate.

The innermost shroud member 9 supports a frame 32 which is apertured at 33 to receive the pin 27 so that the frame 32 may also rotate with the shroud members 2–9. The frame 32 is provided with a hook portion 34 extending along its upper edge for engagement with the lower hook portion 21 on the side wall member 11. An array of guide vanes 35 is carried in the frame 32. The guide vanes 35 are fixed transversely in the frame 32 at an angle which ensures that when the nozzle is deployed, ie the shroud members 2–9 occupy the positions shown in FIG. 3 (and in FIG. 6a), air issuing through the nozzle is directed vertically downwards to develop vertical lift. When the nozzle is in the stowed position as shown in FIGS. 5 and 6b, ie the frame is flush with the airframe, the air stream is vectored rearwardly by the nozzle to generate forward transition.

Each shroud member 2–9 may be provided with a pair of inwardly directed pins 36,37 one in each side wall member 11,12. These are engaged on their undersides by the upper edges of the adjacent lower shroud member or, in the case of the lowest shroud member 9, by the upper edge of the frame 32, when the nozzle is being retracted from the extended position shown in FIG. 3 to the stowed position shown in FIG. 5.

The sides of the frame 32 are each provided with an upwardly directed bracket 38,39 to each of which is connected the end of an actuator rod 41,42 extending from the body 43,44 of a nozzle actuator jack which is extendable to displace the nozzle from the stowed position into the deployed position.

In operation, in order to deploy the nozzle from the stowed position shown in FIG. 5 the actuator rods 41,42 are extended. The frame 32 rotates until the hook portions 16,17 on the top edges of the frame engage the hook portions 21,22 on the bottom edges of the shroud member 9 interlock. Continued extension of the piston rods causes the hook portions 16,17 on the top edge of the shroud member to engage the hook portions 21,22 on the bottom edges of the shroud member 8, and so on until all of the shroud members have been extended to the deployed position shown in FIG. 3. The hook portions 23,24 on the upper and lower edges of the end walls 13 engage one another and interlock in a similar manner as nozzle deployment takes place.

When the actuator rods 41,42 are retracted into actuator housings 43,44 the frame 32 is drawn upwardly disengaging the interlocking hook portions of the frame and shroud members. Engagement of the pins 36,37 by the upper edge of the ascending lower shroud member or frame ensures that the members and frame retract telescopically as shown in FIG. 5.

The frame carrying the array of guide vanes is hinged to the airframe at the forward end of the frame and may be of any shape to match the ducting within the airframe which supplies the exhaust gas or air to the nozzle. The frame must however, be capable of interfacing with the innermost of the shroud members.

The interlocking of the shrouds prevents the gas or air stream spilling over the sides of the frame, and being lost when the frame is moving to the interlocked deployed position. The depth of each shroud member is dictated by the space available in the airframe.

Figure 6A:
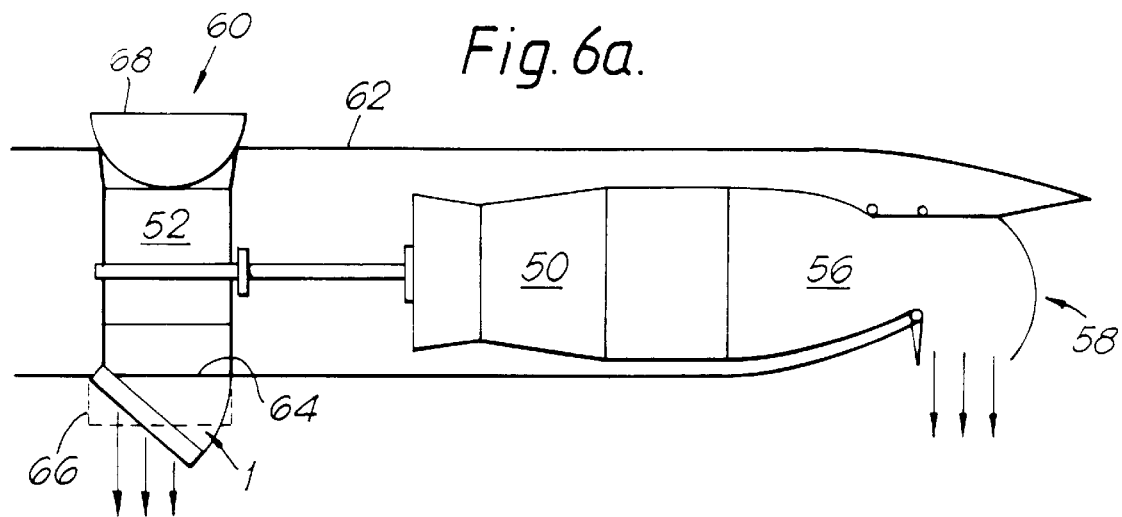
FIGS. 6a and 6b show side view of an aircraft propulsion engine and lift fan installation illustrating the lift fan deflection nozzle in vertical lift and forward transition deployments respectively.
Figure 6B:
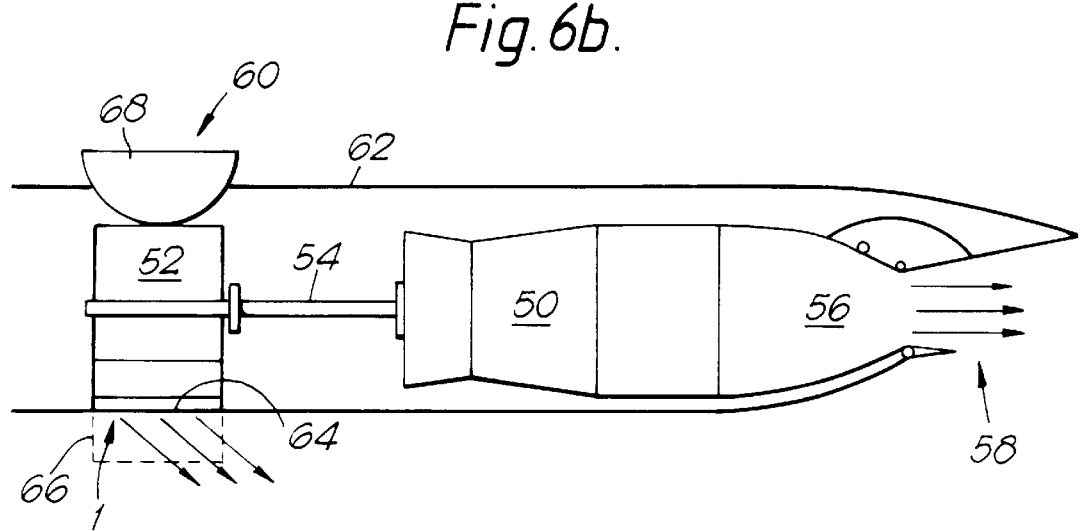

FIGS. 6a and 6b show a possible disposition of propulsion engine 50, lift fan module 52, drive shaft 54 and lift fan deflection nozzle 1. The propulsion engine 50 may exhaust into a jet pipe 56 provided at its downstream end with a further deflection nozzle 58. This second deflection nozzle is not a concern of the present invention. The drive shaft 54 may include a clutch mechanism (not shown) for selectively transmitting drive from propulsion engine 50 to lift fan 52.

Air is drawn into fan 52 through an intake aperture 60 in the upper surface of the aircraft fuselage 62 and exhausted generally downwardly through an exit aperture 64 in the underside of the fuselage. Exit aperture 64 may be closed by doors 66.

The vectoring deflection nozzle 1 is mounted below fan 52 adjacent exit aperture 64 and when deployed, as shown in FIG. 6a, extends through the aperture. When the nozzle 1 is telescopically retracted and the fan stopped the upper and lower doors 66,68 may be closed to lie flush with the fuselage skin.

The deflection nozzle 1 has two operating positions shown in FIGS. 6a and 6b respectively. In the first in FIG. 6a the telescoping part of the nozzle is fully extended and the angle guide vanes deliver the lift fan exhaust substantially undeflected in a downward direction. Although the guide vanes frame is deployed at an angle relative to the fan axis the guide vanes themselves are angularly disposed relative to the frame such that downwardly directed fan air continues in the same direction. Although in this fully deployed position the nozzle aerodynamic drag factor is at a maximum value, the vertical lift operational mode means that aircraft forward speed is low or tending towards zero. Thus, drag forces generated by the fully deployed nozzle are correspondingly low or inconsequential.

For the transition to forward flight thrust from the lift fan 52 is vectored rearwardly. To do this the telescoping members of nozzle 1 are retracted so that the guide vane frame 32 lies within the exit aperture in the underside of fuselage 62. In this position the fixed disposition of the guide vanes themselves alter the direction of the fan exhaust air in a rearward direction as shown by the arrows in FIG. 6b. The rearwardly vectored air generates forward thrust (towards the left in the plane of the drawings) and accelerates the aircraft in a forward direction. However, as aircraft speed increase nozzle drag is virtually absent because no part of the nozzle (closure doors 66 excepted) extend into the airstream. Once sufficient forward speed is achieved the fan drive shaft 54 is declutched, the fan runs down and the closure doors 66,68 are closed. The present nozzle arrangement possess a further inherent advantage of minimum weight because the nozzle guide vanes are fixed and need no variable camber or variable angle-of-incidence mechanism to achieve vectoring.

It will be appreciated that the deflecting nozzle of the present invention may be used to vector a gas stream however the flow in that stream is produced. Thus, although in the example described the flow is produced by a shaft drive lift fan, the fan could be gas driven in another example. The flow might also be produced by a gas turbine engine directly either by in the form of a direct lift engine or by a conventional propulsive engine with ducted gas streams.

I claim:

1. A vectoring nozzle comprising a telescoping duct arrangement having at its terminal end thrust deflecting means consisting of a cascade of parallel guide vanes disposed to vector gas issuing from the duct in a substantially downward direction for vertical lift when the nozzle is extended and in a substantially rearward direction for forwarded thrust when the nozzle is retracted.

2. A vectoring nozzle as claimed in claim 1 wherein the cascade of thrust deflecting guide vanes is carried in a frame pivotally mounted towards its forward side.

3. A vectorable nozzle as claimed in claim 1 wherein the telescoping duct comprises a plurality of generally U-shaped shroud members interlocked one with another in telescoping manner, the U-shaped members being pivoted toward their open sides whereby said plurality of shroud members may fit one within another so as to telescope together to a stowed position for a first mode of operation and to extend to a deployed position for a second mode of operation.

4. A vectorable nozzle as claimed in claim 3 wherein each of said plurality of shroud members is provided with interlocking means whereby adjacent shroud members interlock when said plurality of shroud members is extended to a deployed position.

5. A vectorable nozzle as claimed in claim 3 wherein said frame and said shroud members which fit within other shroud members so as to telescope are provided with interlocking means whereby upon rotation of said frame said shroud members are movable between said stowed position and said deployed position.

6. A vectorable nozzle as claimed in claim 1 further comprising means to rotate said nozzle to a stowed position.

7. An aircraft possessing a vertical lift capability, wherein the improvement comprises:

a vectorable exhaust nozzle comprising a telescoping duct arrangement having at its terminal end thrust deflecting means consisting of a cascade of parallel guide vanes disposed to vector gas issuing from the duct in a substantially downward direction for vertical lift when the nozzle is extended and in a substantially rearward direction for forwarded thrust when the nozzle is retracted.

* * * * *